United States Patent
Luo et al.

(10) Patent No.: US 12,267,538 B2
(45) Date of Patent: Apr. 1, 2025

(54) REAL-TIME VIDEO TRANSMISSION SYSTEM FOR CELLULAR-CONNECTED UAV BASED ON ADAPTIVE BITRATE

(71) Applicant: HARBIN INSTITUTE OF TECHNOLOGY, SHENZHEN, Shenzhen (CN)

(72) Inventors: Jingjing Luo, Shenzhen (CN); Xin Liu, Shenzhen (CN); Fu-chun Zheng, Shenzhen (CN); Lin Gao, Shenzhen (CN); Qinyu Zhang, Shenzhen (CN)

(73) Assignee: Harbin Institute of Technology, Shenzhen, Shenzhen (CN)

( * ) Notice: Subject to any disclaimer, the term of this patent is extended or adjusted under 35 U.S.C. 154(b) by 47 days.

(21) Appl. No.: 18/210,142

(22) Filed: Jun. 15, 2023

(65) Prior Publication Data

US 2024/0098319 A1    Mar. 21, 2024

(30) Foreign Application Priority Data

Jun. 15, 2022 (CN) .......................... 202210674561.4

(51) Int. Cl.
| | | |
|---|---|---|
| H04N 21/238 | (2011.01) | |
| H04N 21/214 | (2011.01) | |
| H04N 21/2187 | (2011.01) | |
| H04N 21/24 | (2011.01) | |
| H04N 21/44 | (2011.01) | |

(Continued)

(52) U.S. Cl.
CPC ..... *H04N 21/23805* (2013.01); *H04N 21/214* (2013.01); *H04N 21/2187* (2013.01); *H04N 21/2402* (2013.01); *H04N 21/44004* (2013.01); *H04N 21/4621* (2013.01); *H04N 21/6143* (2013.01)

(58) Field of Classification Search
CPC .......... H04N 21/23805; H04N 21/214; H04N 21/2187; H04N 21/2402; H04N 21/6143; H04N 21/44004; H04N 21/4621
See application file for complete search history.

(56) References Cited

U.S. PATENT DOCUMENTS

| | | | | |
|---|---|---|---|---|
| 10,666,941 B1 * | 5/2020 | Doron | ............... | H04N 21/21805 |
| 2011/0075728 A1 * | 3/2011 | Tanida | ................. | H04N 19/149 |
| | | | | 375/E7.015 |

(Continued)

FOREIGN PATENT DOCUMENTS

| | | | | |
|---|---|---|---|---|
| CN | 106506331 A | * | 3/2017 | ............. H04L 51/04 |

*Primary Examiner* — Jefferey F Harold
*Assistant Examiner* — Alexander Boyd
(74) *Attorney, Agent, or Firm* — Hoffmann & Baron, LLP

(57) ABSTRACT

In a real-time video transmission system for a cellular-connected unmanned aerial vehicle (UAV) based on an adaptive bitrate provided by the present disclosure, an on-board computer is loaded and configured on the UAV, such that the UAV can provide multiple video streams with different bitrates for retrieval. A client with a bitrate adaptation unit is set up, allowing the system to adjust the bitrate of the video stream according to network conditions in each time interval. Intranet penetration and port mapping are implemented on the cloud server, enabling the client to obtain, from the cloud server, the real-time video stream captured by the UAV. The present disclosure allows a remote user to watch, through a cellular network, the real-time video stream captured by the UAV.

7 Claims, 3 Drawing Sheets

(51) Int. Cl.
*H04N 21/462* (2011.01)
*H04N 21/61* (2011.01)

(56) References Cited

U.S. PATENT DOCUMENTS

| | | | |
|---|---|---|---|
| 2015/0381690 A1* | 12/2015 | Schmidt | H04N 21/2343 |
| | | | 709/231 |
| 2020/0321030 A1* | 10/2020 | Kellicker | H04N 21/44008 |
| 2021/0067819 A1* | 3/2021 | Sen | H04N 21/236 |
| 2021/0352127 A1* | 11/2021 | Wang | H04N 21/2662 |
| 2023/0247205 A1* | 8/2023 | Gillis | H04N 21/8456 |
| | | | 375/240.03 |
| 2024/0020968 A1* | 1/2024 | Haskin | G06F 16/29 |
| 2024/0045672 A1* | 2/2024 | Wang | G06F 8/77 |

* cited by examiner

Buffer

REAL-TIME VIDEO TRANSMISSION SYSTEM FOR CELLULAR-CONNECTED UAV BASED ON ADAPTIVE BITRATE

CROSS REFERENCE TO RELATED APPLICATION

This patent application claims the benefit and priority of Chinese Patent Application No. 202210674561.4, filed with the China National Intellectual Property Administration on Jun. 15, 2022, the disclosure of which is incorporated by reference herein in its entirety as part of the present application.

TECHNICAL FIELD

The present disclosure relates to the field of unmanned aerial vehicle (UAV) video transmission, and in particular, to a real-time video transmission system for a cellular-connected UAV based on an adaptive bitrate.

BACKGROUND

In recent years, the UAV video transmission technology has emerged and has the potential to be applied in various fields. For example, it can be used in disaster response during natural disasters and emergencies such as earthquakes and tornadoes. UAVs can quickly reach remote areas and use night vision or infrared cameras to accurately locate survivors in the dark. The operation center can use real-time images transmitted from the UAV to the ground station to determine and plan search and rescue operations. UAVs can also be used for agricultural security inspections, and can be employed to detect pest-infested farmlands. In cases where localized pest infestations occur in a vast farmland, it is challenging for ground security personnel alone to monitor the situation effectively. UAVs can be deployed to scan farmlands and alert farmers to pest invasions or animals in the fields. Once pest-infested areas are identified, UAVs can also be used to spray insecticides. UAVs are also used for live streaming events. Sports stadiums and concert venues are often equipped with 20 to 30 or more cameras to capture various live perspectives of the event. The videos captured by UAVs provide a unique aerial view that static cameras cannot achieve. Media companies like Fox News have already started using UAVs for live streaming, which requires reliable transmission of high-definition video streams to ground stations. However, current UAVs for aerial photography on the market mostly rely on point-to-point video transmission and do not integrate with cellular networks. Additionally, these UAVs or aerial photography have limitations in terms of flight distance, which hinders their ability to effectively fulfill the aforementioned application scenarios.

In the aforementioned scenarios, it is necessary to transmit the real-time video captured by the UAV to a streaming media server for further analysis, processing, and broadcasting. Then, the video needs to be transmitted to the client through a cellular network to enable users to watch in real time the video captured by the UAV. This requires a real-time video transmission system for UAVs based on cellular networks, to better facilitate the functionality described above.

In addition, due to the unique nature of UAV flight scenarios, the bandwidth on the UAV-user link may fluctuate significantly. This greatly increases the chances of lagging when a fixed-bitrate architecture is used for video transmission. This is a problem that needs to be addressed in real-time video transmission systems for UAVs.

SUMMARY

To solve the foregoing problem, the present disclosure provides a real-time video transmission system for a cellular-connected UAV based on an adaptive bitrate. The system incorporates a bitrate adaptation unit to adjust the bitrate in response to bandwidth fluctuations, thereby enhancing the Quality of Experience (QoE) for users watching the video.

The present disclosure provides a real-time video transmission system for a cellular-connected UAV based on an adaptive bitrate, including:

a UAV, including a multi-bitrate streaming module and a simple realtime server (SRS) streaming media server, where the multi-bitrate streaming module is configured to perform multi-bitrate encoding on a real-time video captured by the UAV, and stream encoded multi-bitrate videos to the SRS streaming media server, and the SRS streaming media server is configured to allocate stream retrieval addresses for the multi-bitrate videos;

a client, including a bitrate adaptation unit that includes a Media Presentation Description (MPD) parsing module, a downloader module, a player module, and a bitrate decision module, where the MPD parsing module is configured to parse an MPD file of a video, the downloader module is configured to download a video stream, collect bandwidth data, and transmit the bandwidth data to the bitrate decision module, the player module is configured to decode and play the video, collect playback data, and transmit the playback data to the bitrate decision module, and the bitrate decision module is configured to make a bitrate decision by combining the bandwidth data and the playback data and using an Adaptive Bitrate (ABR) algorithm with double buffer thresholds; and a cloud server side configured to map a video pull port of the UAV to a cloud server, such that a client pulls the video stream from the UAV by accessing a corresponding port on the cloud server.

In some embodiments, the multi-bitrate streaming module is loaded with a libx264 library and is configured to provide multi-bitrate video streaming in conjunction with fast forward moving picture experts group (ffmpeg) tool.

In some embodiments, an application programming interface (API) provided by the SRS streaming media server aligns keyframes of videos with different bitrates, to implement seamless switching between video bitrates.

In some embodiments, the downloader module collects the bandwidth data in the following manner: measuring an actual data volume S downloaded by the client within a time interval T, to obtain a bandwidth sampling point B using the following formula: B=S*8*1000/(T*1024).

In some embodiments, the downloader module predicts a bandwidth of a next time interval according to the bandwidth data, where a specific expression used by the downloader module is represented as $$B_n = \frac{5}{\sum_{i=1}^{5} B_{n-i}},$$

wherein $B_n$ represents a predicted bandwidth of the next time interval, and n represents a current time interval.

In some embodiments, the bitrate decision module is configured to make a bitrate decision by combining the bandwidth data and the playback data and using an ABR algorithm with double buffer thresholds, where specifically:

$b_h$ represents a high threshold, $b_l$ represents a low threshold, and $b_c$ represents a current video buffer level, $R=[r_1, r_2, \ldots, r_n]$ denotes a set of selectable bitrates, a bitrate of a currently downloaded video is $r_c$, a group of pictures (GOP) length is D, a time interval is T, and a predicted bandwidth of a next time interval is B, assuming that d has been downloaded in a current GOP when a bitrate decision for the next time interval is made, and that a bitrate of the GOP required to be downloaded is r:

when $r=r_c$, the current GOP is continued to be downloaded, and after downloading in one time interval is completed, a video buffer level is:

$$b=b_c+D-d-(D-d)*r/B \quad \text{Formula 1}$$

when $r!=r_c$, downloading is started from a first frame of the GOP, and after completion of downloading in one time interval, the video buffer level is:

$$b=b_c+D-d-D*r/B \quad \text{Formula 2}$$

when $b_c>b_h$:

in Formula 2, if there does not exist $b\leq b_h$ for any given $r>r_c$, a maximum bitrate is requested;

in Formula 2, if there exists $b\leq b_h$ for any given $r>r_c$, a video that satisfies $b\leq b_h$ and has a minimum bitrate is selected for downloading;

when $b_c<b_l$:

in Formula 2, if there does not exist $b\geq b_l$ for any given $r<r_c$, a finally requested video bitrate is a minimum bitrate; and in Formula 2, if there exists $b\geq b_l$ for any given $r<r_c$, a video that satisfies $b\geq b_l$ and has a maximum bitrate is selected for downloading.

In some embodiments, the cloud server uses a fast reverse proxy (frp) tool for intranet penetration.

In some embodiments, the MPD file is a JavaScript Object Notation (JSON) file.

In the real-time video transmission system for a cellular-connected UAV based on an adaptive bitrate provided by the present disclosure, an on-board computer is loaded and configured on the UAV, such that the UAV can provide multiple video streams with different bitrates for retrieval. A client with a bitrate adaptation unit is set up, allowing the system to adjust the bitrate of the video stream according to network conditions in each time interval. Intranet penetration and port mapping are implemented on the cloud server, enabling the client to obtain, from the cloud server, the real-time video stream captured by the UAV. The present disclosure achieves the following advantages and positive effects: The present disclosure allows a remote user to watch, through a cellular network, the real-time video stream captured by the UAV. The system implemented by the present disclosure can better adapt to fluctuations of the network bandwidth in the UAV-user link and provide bitrate adaptive video streams, thereby reducing the risk of lagging while improving bandwidth utilization. Compared with the traditional fixed-bitrate video transmission architecture, the bitrate adaptive architecture can better cope with bandwidth fluctuations.

BRIEF DESCRIPTION OF THE DRAWINGS

The accompanying drawings incorporated into the specification and constituting part of the specification illustrate the examples of the present disclosure, and serve, together with the specification, to explain the principles of the present disclosure. It should be noted that the drawings in the following description show merely some embodiments of the present disclosure, and those of ordinary skill in the art may still derive other drawings from these drawings without creative efforts.

DETAILED DESCRIPTION OF THE EMBODIMENTS

Figure 1:
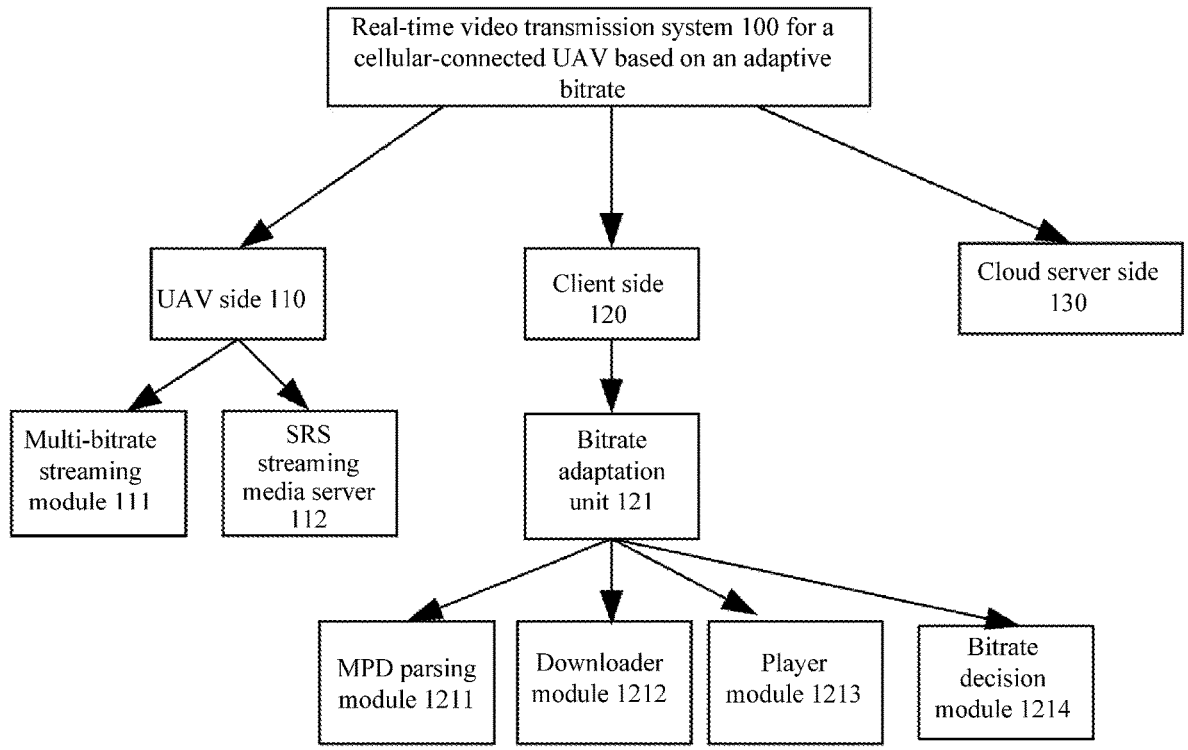
FIG. 1 is schematic structural diagram of a real-time video transmission system for a cellular-connected UAV based on an adaptive bitrate according to an embodiment of the present disclosure.

To better describe the embodiments of the present disclosure in further detail, the embodiments are implemented on the premise of the technical solutions of the present disclosure, and detailed implementations and specific steps are provided.

The features, structures, or characteristics described in the present disclosure may be incorporated into one or more implementations in any suitable manner. In the following description, many specific details are provided to give a full understanding of the implementations of the present disclosure. However, those skilled in the art will be aware that the technical solutions of the present disclosure may be practiced with one or more of the specific details omitted, or other methods, components, apparatuses, steps, and the like may be used. In other cases, well-known methods, apparatuses, implementations, or operations are not shown or described in detail to avoid obscuring aspects of the present disclosure.

The accompanying drawings are merely schematic diagrams of the present disclosure, and identical reference numerals in the accompanying drawings denote identical or similar parts. Therefore, repeated description thereof will be omitted. Some of the block diagrams shown in the accompanying drawings do not necessarily correspond to physically or logically independent entities. These functional entities may be implemented in the form of software, or implemented in one or more hardware modules or integrated circuits, or implemented in different networks and/or processor apparatuses and/or microcontroller apparatuses.

Embodiments of the present disclosure provide a real-time video transmission system for a cellular-connected UAV based on an adaptive bitrate. The following embodiment is provided.

This embodiment is used for illustrating a real-time video transmission system 100 for a cellular-connected UAV based on an adaptive bitrate. FIG. 1 is a structural block diagram of the system in this embodiment. The system 100 includes:

a UAV 110, including a multi-bitrate streaming module 111 and an SRS streaming media server 112, where the multi-bitrate streaming module 111 is configured to perform multi-bitrate encoding on a real-time video captured by the UAV, and stream encoded multi-bitrate videos to the SRS streaming media server 112, and the SRS streaming media server 112 is configured to allocate stream retrieval addresses for the multi-bitrate videos;

a client 120, including a bitrate adaptation unit 121 that includes an MPD parsing module 1211, a downloader module 1212, a player module 1213, and a bitrate decision module 1214, where the MPD parsing module 1211 is configured to parse an MPD file of the video, the downloader module 1212 is configured to download a video stream, collect bandwidth data, and transmit the bandwidth data to the bitrate decision module 1214, the player module 1213 is configured to decode and play the video, collect playback data, and transmit the playback data to the bitrate decision module 1214, and the bitrate decision module 1214 is configured to make a bitrate decision by combining the bandwidth data and the playback data and using an ABR algorithm with double buffer thresholds; and a cloud server side 130 configured to map a video pull port of the UAV to the cloud server, such that the client pulls the video stream from the UAV by accessing the corresponding port on the cloud server.

In some embodiments, the multi-bitrate streaming module 111 is loaded with a libx264 library and is configured to provide multi-bitrate video streaming in conjunction with a fast forward moving picture experts group (ffmpeg) tool.

In some embodiments, an API provided by the SRS streaming media server 112 aligns keyframes of videos with different bitrates, to implement seamless switching between video bitrates.

In a specific implementation process, the libx264 library of the ffmpeg tool is used to perform multi-bitrate encoding on the real-time video captured by the UAV, and encoded videos are streamed to the SRS streaming media server. The SRS streaming media server, which is set up on the UAV, allocates stream retrieval addresses for the multi-bitrate videos and aligns the keyframes to achieve seamless video switching.

First, the on-board computer of the UAV is configured. A USB camera is connected to the on-board computer to serve as a video capture tool. An LTE module and an antenna are installed to enable video transmission through a cellular network. On the on-board computer, the streaming tool ffmpeg is configured, to allow settings of the format, bitrate, frame rate, and other information for the streaming video. Then, the libx264 library is loaded, which, when used in conjunction with ffmpeg, can provide multi-bitrate video streaming. A data segment of the streaming video needs to be temporarily stored, and a stream retrieval address needs to be allocated for the video stream to allow users to pull the video stream. In a traditional live streaming architecture, these tasks are performed by a streaming media server. In this embodiment, an SRS streaming media server is set up on the on-board computer to allocate the stream retrieval address for the streaming video.

Figure 2:
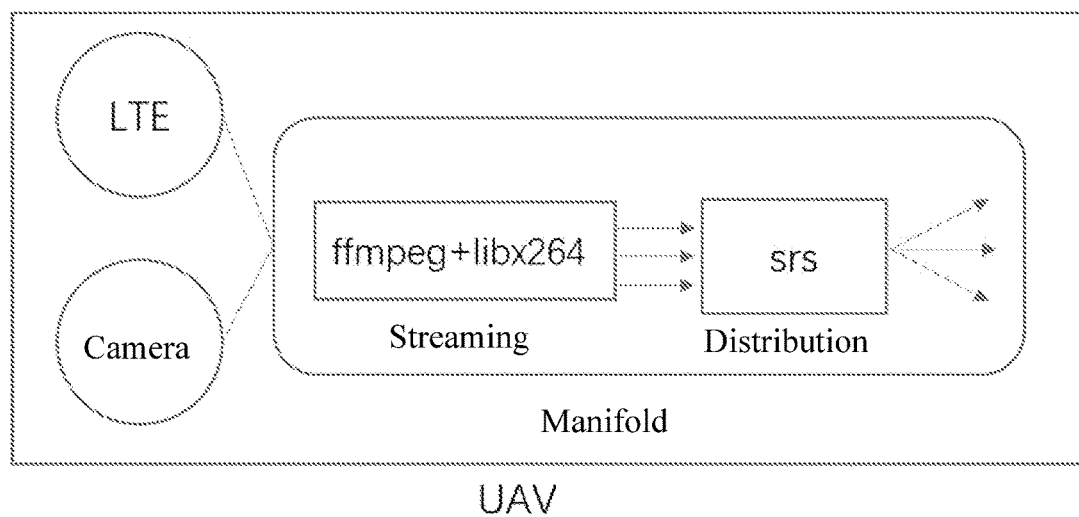
FIG. 2 is a schematic structural diagram of a UAV in the system according to an embodiment of the present disclosure.

In another embodiment, capture and streaming of multi-bitrate video streams, as well as allocation of stream retrieval addresses for the multi-bitrate video streams needs to be implemented by the UAV. The DJI M300 is used as the UAV, and the Manifold 2-C is used as the on-board computer. A USB camera is connected to the on-board computer to serve as a video capture tool. An LTE module and an antenna are installed to enable video transmission through a cellular network. For video capture, the most common method is to use ffmpeg for streaming. With ffmpeg, the format, bitrate, frame rate, and other information of the captured video can be set. Then, the libx264 library is loaded, which, when used in conjunction with ffmpeg, can provide multi-bitrate video streaming. A data segment of the streaming video needs to be temporarily stored, and a stream retrieval address needs to be allocated for the video stream to allow users to pull the video stream. In a traditional live streaming architecture, these tasks are performed by a streaming media server. Thus, an SRS streaming media server is set up on the on-board computer to allocate the stream retrieval address for the streaming video. FIG. 2 is a schematic structural diagram of the UAV.

Video capture and streaming on the UAV require a streaming tool. Two commonly used tools are Open Broadcaster Software (OBS) and ffmpeg. OBS is a tool commonly used for user-initiated live streaming and offers a user-friendly interface. However, it may not be as convenient for development and usage on Linux systems. On the other hand, ffmpeg is a tool that can start streaming directly from a terminal window, making it easier for development. Therefore, ffmpeg is used for streaming.

Additionally, since ffmpeg may not include specific software encoders when downloaded, it is necessary to download and configure the libx264 encoding library for software encoding of videos. Moreover, the libx264 library provides APIs for multi-stream encoding, which, when used in conjunction with ffmpeg, allows for the streaming of videos with multiple bitrates.

Considering the potential fluctuations of the uplink connection of the UAV, bitrate adaptation is also desirable for the video on the link between the UAV and the cloud server. Therefore, for individual users, it is possible to achieve global adaptation, that is, bitrate adaptation across the entire UAV-user link. This requires the video stream to be temporarily stored on the UAV. Therefore, a streaming media server needs to be set up on the UAV. SRS is an excellent open-source streaming media server developed by Chinese developers. It can be used in various scenarios such as live streaming, video-on-demand, and video customer service. The SRS is designed to be a carrier-grade internet live streaming server cluster. Therefore, the SRS is set up on the UAV to allocate stream retrieval addresses and ports for the video streams pushed by ffmpeg. Additionally, the API provided by the SRS is used to align keyframes of videos with different bitrates, ensuring seamless switching between video bitrates. Moreover, the keyframes are aligned to achieve seamless video switching.

Figure 3:
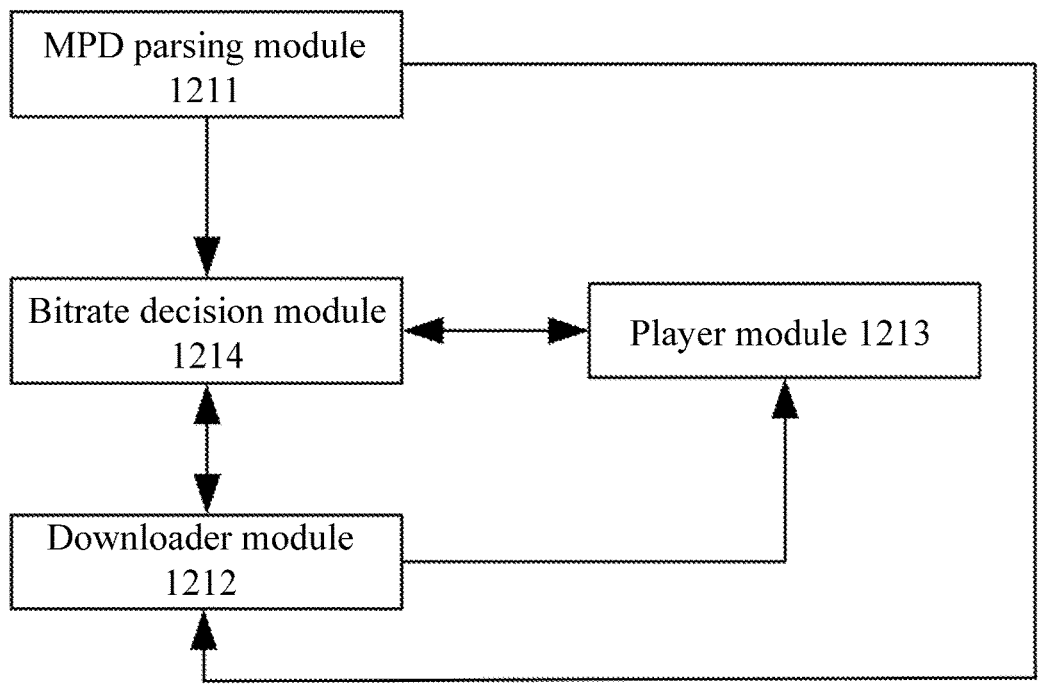
FIG. 3 is a schematic structural diagram of a client according to an embodiment of the present disclosure.

In the specific implementation process, the schematic structural diagram of the client is shown in FIG. 3, which includes four modules: an MPD parsing module 1211, a downloader module 1212, a player module 1213, and a bitrate decision module 1214.

In some embodiments, the MPD file is a JSON file. In the specific implementation process, Media Presentation (MP) is a set of data accessed by the client to provide a streaming media service to users. The MP includes encoded and transmittable media stream information. Media Presentation Description (MPD) is a JSON document that contains metadata. The client parses the metadata to construct a request for obtaining a media stream and provides the streaming media service to users. The MPD parsing module is responsible for parsing the JSON document to obtain video stream information.

In some embodiments, the downloader module 1212 collects bandwidth data in the following manner: measuring an actual data volume S downloaded by the client within a time interval T, to obtain a bandwidth sampling point B using the following formula: $B=S*8*1000/(T*1024)$.

In the specific implementation process, the downloader module has two main tasks:

1. Request Generation:

(1) Playback Initiation Request:

When playback is initiated, a URL address corresponding to a media representation to be requested is obtained according to a default initial media representation in the MPD, and streaming is performed.

(2) Switching Request:

During media playback, if a media representation outputted by an adaptive strategy is the same as the media representation currently downloaded, the output of the adaptive strategy is ignored and it is unnecessary to generate a new request. If the media representation outputted by adaptive strategy is different from the media representation currently being downloaded, a corresponding URL is obtained according to the ID of the media representation outputted by the adaptive strategy, to switch to another video for downloading.

2. Network Status Collection

The downloader module, while downloading the media, is responsible for collecting the network status. At intervals of a fixed period of time T (in milliseconds), an actual data volume S (in bytes) downloaded by the client during this period of time is measured, to obtain a bandwidth sampling point B (in kilobits per second) using the following formula: B=S*8*1000/(T*1024). This bandwidth represents an actual bandwidth on the UAV-user link.

In some embodiments, the downloader module predicts a bandwidth of a next time interval according to the bandwidth data, where a specific expression is represented as $$B_n = \frac{5}{\sum_{i=1}^{5} B_{n-i}},$$

$B_n$ represents the predicted bandwidth of the next time interval, and n represents a current time interval.

In a specific implementation example, with T set to 500 ms, the bandwidth of the next time interval is estimated based on these bandwidth sampling points, to serve as the basis for bitrate adjustment. The harmonic mean of the past five bandwidth measurements is used to predict the bandwidth of the next time interval:

$$B_n = \frac{5}{\sum_{i=1}^{5} B_{n-i}}$$

In the specific implementation process, the player module 1213 has two main tasks. One is decoding. During decoding, priority is given to high quality. That is, when bitrate switching occurs, if there is an overlap between high and low bitrates, a media representation with the higher bitrate will be played. Additionally, during switching between high and low bitrates, playback timestamps (pts) are aligned to achieve seamless switching. The second task is playback status collection. While decoding, the player module 1213 passes relevant status information to the bitrate adaptation module at fixed time intervals. The time interval herein is the same as the time interval T used by the downloader module 1212, that is, the same timer trigger is used. The player module collects various status information, including the current video buffer level, the number of lags, lag duration, and the number of dropped frames.

Figure 4:
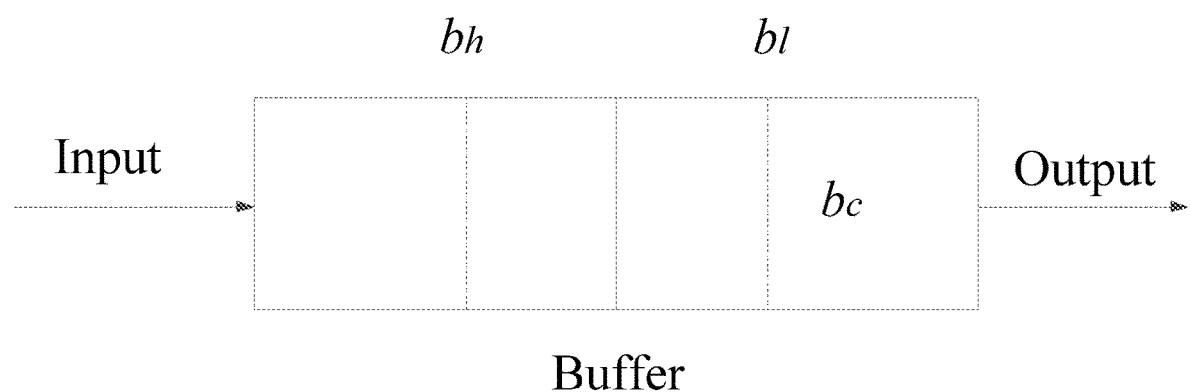
FIG. 4 is a schematic structural diagram of a buffer model used in a bitrate decision module in the system according to an embodiment of the present disclosure.

In the specific implementation process, the bitrate decision module 1214 uses an ABR algorithm with double buffer thresholds to make a bitrate decision in each time interval. The buffer model is shown in FIG. 4, $b_h$ represents a high threshold, $b_l$ represents a low threshold, and $b_c$ represents a current video buffer level.

In some embodiments, the bitrate decision module 1214 is configured to make a bitrate decision by combining the bandwidth data and the playback data and using an ABR algorithm with double buffer thresholds, where specifically:

$b_h$ represents a high threshold, $b_l$ represents a low threshold, and $b_c$ represents a current video buffer level, $R=[r_1, r_2, \ldots, r_n]$ denotes a set of selectable bitrates, a bitrate of a currently downloaded video is $r_c$, a GOP length is D, a time interval is T, and a predicted bandwidth of a next time interval is B, assuming that d has been downloaded in a current GOP when a bitrate decision for the next time interval is made, and that a bitrate of the GOP required to be downloaded is r:

when $r=r_c$, the current GOP is continued to be downloaded, and after downloading in one time interval is completed, a video buffer level is:

$$b=b_c+D-d-(D-d)*r/B \qquad \text{Formula 1}$$

when $r!=r_c$, downloading is started from a first frame of the GOP, and after completion of downloading in one time interval, the video buffer level is:

$$b=b_c+D-d-D*r/B \qquad \text{Formula 2}$$

when $b_c > b_h$:

in Formula 2, if there does not exist $b \leq b_h$ for any given $r > r_c$, a maximum bitrate is requested;

in Formula 2, if there exists $b \leq b_h$ for any given $r > r_c$, a video that satisfies $b \leq b_h$ and has a minimum bitrate is selected for downloading;

when $b_c < b_l$:

in Formula 2, if there does not exist $b \geq b_l$ for any given $r < r_c$, a finally requested video bitrate is a minimum bitrate; and in Formula 2, if there exists $b \geq b_l$ for any given $r < r_c$, a video that satisfies $b \geq b_l$ and has a maximum bitrate is selected for downloading.

In the specific implementation process, before setting up the client, it is necessary to introduce las.js, which is a JavaScript library that can implement a multi-bitrate web side for FLV live streaming. It relies on HTML5 video and the MediaSource extension for playback. It works by converting FLV transport streams into a fragmented MP4 format and supports the use of a web worker. Additionally, it can be directly used on a standard HTML <video> element.

Local dev-server set up, where webpack-dev-server, which is a small Node.js Express server, utilizes webpack-dev-middleware to serve webpack bundles. This allows an HTML webpage of the player to run on a local server, such that js files can be bundled and compiled in real time. During runtime of the player, the player automatically refreshes and updates video data.

The specific implementation steps are as follows: First, an HTML source file is placed in an app folder and bundled into bundle.js under a build folder by using webpack, a package.json file is configured, and a local port 8081 is used as an access port for the player—inline:true is set to enable hot refresh. Finally, the dev-server is run by using the command "npm run start" in the command line (Node and npm need to be downloaded and configured beforehand). After that, the player can be accessed through the port 8081.

The MPD file is a JSON file that includes information about the bitrate, frame rate, resolution, and other information of the multi-bitrate video streams set by the streaming side, and also includes settings of the stream retrieval address and initial playback resolution. These pieces of information are passed into a browser through a constructed parsing function and then validated. The parsed information is then passed to a bitrate decision maker, which provides a list of switchable video bitrate indices. The initial playback resolution is sent to the downloader module for loading the video.

When a user accesses the local port 8081, the downloader module loads the video stream according to the video address corresponding to the initial playback resolution. The video of the corresponding address is played by using the src attribute of the video tag. During the video playback process, the downloader module is responsible for recording downloading bandwidth data, while the player is responsible for recording information such as the video buffer level. The recorded data is then exported to the bitrate decision module to decide a bitrate. An index of the bitrate of the next time interval is obtained, and the result is passed to the downloader, which switches the bitrate. The bitrate switching is strictly performed at the keyframe position within the GOP, to implement seamless switching.

The bitrate decision module, after receiving the bandwidth data and buffer data by using the import keyword, first calculates the harmonic mean of the bandwidth values of the past five time intervals, to serve as the predicted bandwidth value of the next time interval, and then makes a decision by combining the buffer information with the predicted bandwidth value and using an ABR algorithm model with double thresholds, to give an index of the bitrate of the next time interval.

In some embodiments, the cloud server uses an frp tool for intranet penetration.

In the specific implementation process, to achieve bitrate adaptation, the UAV is required to provide videos with different resolutions for retrieval. However, since the UAV does not have its own public IP address, a remote user cannot locate the UAV to retrieve the video. Therefore, intranet penetration needs to be performed to map the listening port of the Manifold video stream to the corresponding port in the cloud. This will allow the remote user to pull the stream from the corresponding port in the cloud, to retrieve the UAV-captured video through the cellular network.

Specifically, the working process of the frp includes the following steps:

(1) The cloud server listens on a main port, waiting for a connection from the UAV.
(2) The UAV connects to the main port of the cloud server and informs the server about the port to be listened on and the forwarding type.
(3) The server opens a new process to listen on the specified port on the UAV.
(4) The client connects to the corresponding port on the server, and the server forwards the data to the client through the connection with the UAV.

Figure 5:
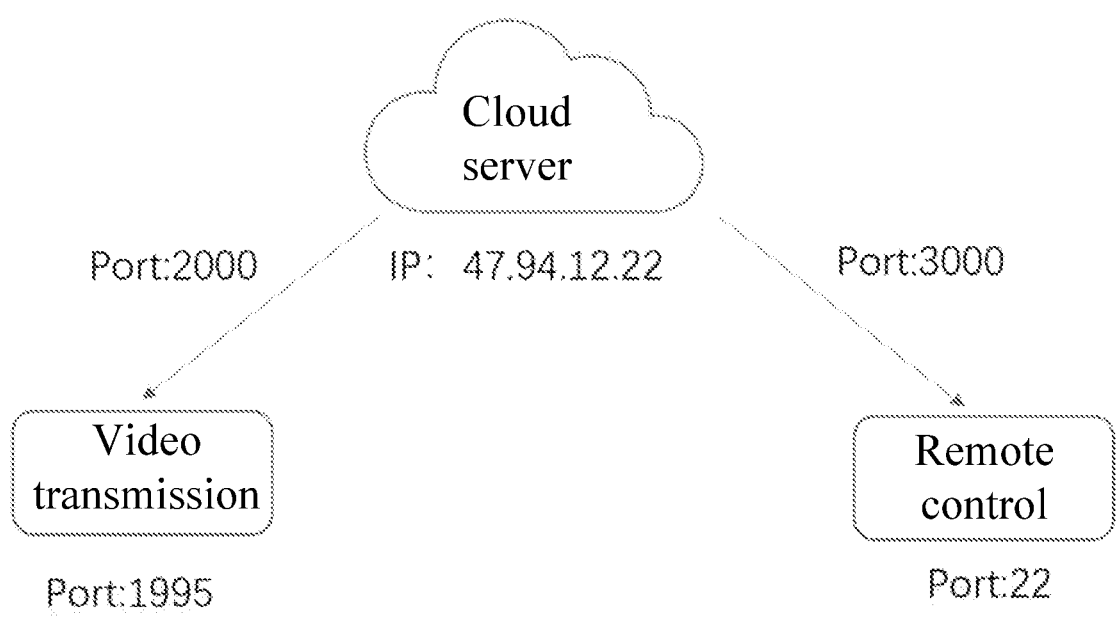
FIG. 5 is a schematic structural diagram of a cloud server side in the system according to an embodiment of the present disclosure.

A specific example of port mapping on the cloud server is shown in FIG. 5. The listening port 1995 of the Manifold video stream is mapped to the port 2000 on the cloud server, the control port 22 is mapped to the port 3000 on the cloud server. Therefore, a remote user can control the UAV by accessing the port 3000 of the cloud server and obtain the video stream by accessing the port 2000. This enables the client to obtain in real time the UAV-captured video through the cellular network.

In the real-time video transmission system for a cellular-connected UAV based on an adaptive bitrate provided by the embodiments of the present disclosure, an on-board computer is loaded and configured on the UAV, such that the UAV can provide multiple video streams with different bitrates for retrieval. A client with a bitrate adaptation unit is set up, allowing the system to adjust the bitrate of the video stream according to network conditions in each time interval. Intranet penetration and port mapping are implemented on the cloud server, enabling the client to obtain, from the cloud server, the real-time video stream captured by the UAV. The present disclosure achieves the following advantages and positive effects: The present disclosure allows a remote user to watch, through a cellular network, the real-time video stream captured by the UAV. The system implemented by the present disclosure can better adapt to fluctuations of the network bandwidth in the UAV-user link and provide bitrate adaptive video streams, thereby reducing the risk of lagging while improving bandwidth utilization. Compared with the traditional fixed-bitrate video transmission architecture, the bitrate adaptive architecture can better cope with bandwidth fluctuations.

In the specification, the terms "include", "comprise", or any other variations thereof are intended to cover a non-exclusive inclusion, so that a step or a method including a series of elements not only includes those elements, but also includes other elements that are not explicitly listed, or also includes inherent elements of the step or the method.

The present disclosure is described in further detail above with reference to the specific and preferred implementations, but the description should not be construed as a limitation to the specific implementation of the present disclosure. It will be apparent to those skilled in the art that certain simple modifications or substitutions may be made without departing from the spirit of the present disclosure, and all such modifications or substitutions are intended to be within the protection scope of the present disclosure.

What is claimed is:

1. A real-time video transmission system for a cellular-connected unmanned aerial vehicle (UAV) based on an adaptive bitrate, the system comprising:
a UAV, comprising a multi-bitrate streaming module and a simple realtime server (SRS) streaming media server, wherein the multi-bitrate streaming module is configured to perform multi-bitrate encoding on a real-time video captured by the UAV, and stream encoded multi-bitrate videos to the SRS streaming media server, and the SRS streaming media server is configured to allocate stream retrieval addresses for the multi-bitrate videos;
a client, comprising a bitrate adaptation unit that comprises a Media Presentation Description (MPD) parsing module, a downloader module, a player module, and a bitrate decision module, wherein the MPD parsing module is configured to parse an MPD file of a video, the downloader module is configured to download a video stream, collect bandwidth data, and transmit the bandwidth data to the bitrate decision module, the player module is configured to decode and play the video, collect playback data, and transmit the playback data to the bitrate decision module, and the bitrate decision module is configured to make a bitrate decision by combining the bandwidth data and the playback data and using an Adaptive Bitrate (ABR) algorithm with double buffer thresholds; and a cloud server side configured to map a video pull port of the UAV to a cloud server, such that the client pulls the video stream from the UAV by accessing a corresponding port on the cloud server;

wherein the bitrate decision module is configured to make a bitrate decision by combining the bandwidth data and the playback data and using an ABR algorithm with double buffer thresholds, wherein specifically:

$b_h$ represents a high threshold, $b_l$ represents a low threshold, and $b_c$ represents a current video buffer level, $R=[r_1, r_2, \ldots, r_n]$ denotes a set of selectable bitrates, a bitrate of a currently downloaded video is $r_c$, a GOP length is D, a time interval is T, and a predicted bandwidth of a next time interval is B, assuming that d has been downloaded in a current GOP when a bitrate decision for the next time interval is made, and that a bitrate of the GOP required to be downloaded is r:

when $r=r_c$, the current GOP is continued to be downloaded, and after completion of downloading, a video buffer level is:

$b=b_c+D-d-(D-d)*r/B$      Formula 1:

when $r!=r_c$, downloading is started from a first frame of the GOP, and after completion of downloading, the video buffer level is:

$b=b_c+D-d-D*r/B$      Formula 2:

when $b_c>b_h$:

in Formula 2, if there does not exist $b \leq b_h$ for any given $r>r_c$, a maximum bitrate is requested;

in Formula 2, if there exists $b \leq b_h$ for any given $r>r_c$, a video that satisfies $b \leq b_h$ and has a minimum bitrate is selected for downloading;

when $b_c<b_l$:

in Formula 2, if there does not exist $b \geq b_l$ for any given $r<r_c$, a finally requested video bitrate is a minimum bitrate; and in Formula 2, if there exists $b \geq b_l$ for any given $r<r_c$, a video that satisfies $b \geq b_l$ and has a maximum bitrate is selected for downloading.

2. The real-time video transmission system for a cellular-connected UAV based on an adaptive bitrate according to claim 1, wherein the multi-bitrate streaming module is loaded with a libx264 library and is configured to provide multi-bitrate video streaming in conjunction with a fast forward moving picture experts group (ffmpeg) tool.

3. The real-time video transmission system for a cellular-connected UAV based on an adaptive bitrate according to claim 1, wherein an application programming interface (API) provided by the SRS streaming media server aligns keyframes of videos with different bitrates, to implement seamless switching between video bitrates.

4. The real-time video transmission system for a cellular-connected UAV based on an adaptive bitrate according to claim 3, wherein the downloader module predicts a bandwidth of a next time interval according to the bandwidth data, a specific expression used by the downloader module being represented as $$B_n = \frac{5}{\sum_{i=1}^{5} B_{n-i}},$$

wherein $B_n$ represents a predicted bandwidth of the next time interval, and n represents a current time interval.

5. The real-time video transmission system for a cellular-connected UAV based on an adaptive bitrate according to claim 1, wherein the downloader module collects the bandwidth data in the following manner: measuring an actual data volume S downloaded by the client within a time interval T, to obtain a bandwidth sampling point B using the following formula: $B=S*8*1000/(T*1024)$.

6. The real-time video transmission system for a cellular-connected UAV based on an adaptive bitrate according to claim 1, wherein the cloud server uses a fast reverse proxy (frp) tool for intranet penetration.

7. The real-time video transmission system for a cellular-connected UAV based on an adaptive bitrate according to claim 1, wherein the MPD file is a JavaScript Object Notation (JSON) file.

\* \* \* \* \*